US008468258B2

(12) United States Patent
Pirbhai et al.

(10) Patent No.: US 8,468,258 B2
(45) Date of Patent: Jun. 18, 2013

(54) IPV6 GENERATION TO TRIGGER A VIRTUAL LEASED LINE SERVICE (75) Inventors: Shafiq Pirbhai, Ottawa (CA); Neil D. Hart, Chelsea (CA)

(73) Assignee: Alcatel Lucent, Paris (FR)

( * ) Notice: Subject to any disclaimer, the term of this patent is extended or adjusted under 35 U.S.C. 154(b) by 501 days.

(21) Appl. No.: 12/843,492

(22) Filed: Jul. 26, 2010

(65) Prior Publication Data

US 2012/0023242 A1    Jan. 26, 2012

(51) Int. Cl.
G06F 15/173    (2006.01)

(52) U.S. Cl.
USPC .......................................... 709/228; 709/227

(58) Field of Classification Search
USPC .................................. 709/228, 227
See application file for complete search history.

(56) References Cited

U.S. PATENT DOCUMENTS

| 5,884,297 | A  | * | 3/1999 | Noven ........................ 370/395.3 |
| 7,305,481 | B2 | * | 12/2007 | Blanchet et al. .............. 709/230 |
| 8,175,078 | B2 | * | 5/2012 | Voit et al. ....................... 370/351 |
| 2007/0233887 | A1 | | 10/2007 | Nubani et al. |
| 2010/0177774 | A1 | * | 7/2010 | Hart et al. ...................... 370/392 |
| 2011/0032945 | A1 | * | 2/2011 | Mullooly et al. .............. 370/401 |

FOREIGN PATENT DOCUMENTS

WO    2010079411    7/2010

OTHER PUBLICATIONS

Himanshu Shah et al, "ARP Mediation for IP Interworking of Layer 2 VPN draft-ietf-l2vpn-arp-mediation-13.txt", L2VPN Working Group, Feb. 27, 2010, pp. 1-30.

L. Martini, "IANA Allocations for Pseudowire Edge to Edge Emulation (PWE3)", Network Working Group, RFC 4446, Apr. 2006, pp. 1-9.
T. Narten et al, "Neighbor Discovery for IP Version 6 (IPv6)", Network Working Group, RFC 2461, Dec. 1998, pp. 1-83.
A. Conte, "Extensions to IPv6 Neighbor Discovery for Inverse Discovery Specification", Network Working Group, RFC 3122, Jun. 2001, pp. 1-18.
S. Deering, "ICMP Router Discovery Messages", Network Working Group, RFC 1256, Sep. 1991, pp. 1-17.
J. Loughney, "IPv6 Node Requirements", Network Working Group, RFC 4294, Apr. 2006, pp. 1-18.
International Search Report for PCT/IB2011/001872dated Jan. 23, 2012.
Himanshu Shah, Eric Rosen, Giles Heron, Vach Kompella, ARP Mediation for IP Interworking of Layer 2 VPN; CH-1205 Geneca Switzerland, No. 14, Jul. 7, 2010, pp. 1-31.

(Continued)

*Primary Examiner* — Kevin Bates
(74) *Attorney, Agent, or Firm* — Kramer & Amado P.C.

(57) ABSTRACT

Various embodiments relate to a communications system and related method for determining an address of a service access point (SAP) upon establishment of a service over a packet data network. A customer SAP connected to a provider SAP may request a link-local address for another customer SAP on the far-end of the packet data network. When the service, such as a virtual leased line (VLL) is not yet established, the provider SAP may generate an address for the customer based on another value, such as its own media access control (MAC) address. The generated address may then allow the service to become established, which may allow Neighbor Solicitation and Neighbor Advertisement packets to be sent, analyzed, and extracted. The provider SAP may then replace the generated address with the address extracted from the Neighbor Solicitation or Advertisement packet received after the service was established.

20 Claims, 4 Drawing Sheets

OTHER PUBLICATIONS

Huang AT&T Labs J; IPv6CP Options for PPP Host Configuration; Internet Engineering Task Force, CH-1205 Geneva Switzerland, Feb. 3, 2010, pp. 1-10.

Varada S et al. IP Version 6 over PPP; Sep. 1, 2007.
Thomas Bellcore T Narten IBM S;: IPv6 Stateless Address Autoconfiguration, Dec. 1, 1998.

* cited by examiner

IPV6 GENERATION TO TRIGGER A VIRTUAL LEASED LINE SERVICE

TECHNICAL FIELD

Various exemplary embodiments disclosed herein relate generally to communications devices, specifically connectivity in a packet data network.

BACKGROUND

In modern communications systems, various local devices and local networks may be attached to each other through a packet data network, such as an Internet Protocol (IP) or Multiprotocol Label Switching (MPLS) network. In some instances, a pseudo-local area network (pseudo-LAN) may be established between one or more devices through the packet data network with the use of various devices and techniques. One of the methods for creating such a pseudo-LAN may be the use of one or more pseudowires within the packet data network to connect devices on the edge of the network. Through such emulation of a Layer 2 point-to-point (P2P) connection-oriented service, two devices connected through a packet-switching network may operate in a similar manner to, for example, devices sharing a common provider edge (PE) device.

Configuration of a pseudo-LAN regularly involves the management of devices connected within the pseudo-LAN, including, for example, the resolution of addresses for the devices once the service is established. While the pseudo-LAN may be able to support a variety of services, such as Asynchronous Transfer Mode (ATM), Frame Relay (FR), Ethernet, High-Level Data Link Control (HLDC), MPLS, IPv4 and IPv6 Internet Protocol, some form of address resolution between services of the same layer may be necessary. However, address resolution between devices using different services may not be possible in certain instances, such as during the initial setup through the pseudo-LAN or when an intermediate service is not active.

In view of the foregoing, it would be desirable to have a communications system that enables address resolution between devices. In particular, it would be desirable to have a system capable of resolving addresses of applicable devices during initiation of a service through at least one pseudowire.

SUMMARY

In light of the present need for address resolution in a pseudo-local area network, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in the later sections.

Various embodiments may relate to a method of a provider service access point (SAP) determining an address of a customer SAP. The method may include the provider SAP determining that a virtual leased line (VLL) service connecting a second customer SAP and the first customer SAP is not active and using its media access control (MAC) address to create a substitute IPv6 link local address, wherein the substitute IPv6 link local address acts as the IPv6 link local address for the second customer SAP. The method may also include the provider SAP establishing an IPv6CP session with the first customer SAP using the substitute IPv6 link local address. The provider SAP may receive a Neighbor Solicitation packet or Neighbor Advertisement packet over the VLL service, wherein the established IPv6CP session triggered the VLL service to become active, extract from the Neighbor Solicitation packet or Neighbor Advertisement packet a true IPv6 link local address for the second customer SAP; and renegotiate the IPv6CP session, wherein the true IPv6 link local address replaces the substitute IPv6 link local address.

Various embodiments may also relate to a system of determining an address of a customer service access point (SAP). The system may include a first customer SAP connected to a packet data network that includes a true IPv6 link local address. The system may also include a second customer SAP that solicits the true IPv6 link local address when a virtual leased line (VLL) service between the first and second customer SAPs is not active. The system may also include a provider SAP connected to the second customer SAP and the packet data network that determines when the VLL service connecting a first and second customer SAP is not active, uses its media access control (MAC) address to create a substitute IPv6 link local address, wherein the substitute IPv6 link local address acts as the IPv6 link local address for the first customer SAP, establishes an IPv6CP session with the second customer SAP using the substitute IPv6 link local address, receives a Neighbor Solicitation packet or Neighbor Advertisement packet over the VLL service, wherein the established IPv6CP session triggered the VLL service to become active, and extracts, from the Neighbor Solicitation packet or Neighbor Advertisement packet, a true IPv6 address for the first customer SAP, and reestablishes the IPv6CP session, wherein the true IPv6 link local address replaces the substitute IPv6 link local address.

It should be apparent that, in this manner, various exemplary embodiments enable the management of addresses when establishing a service. Particularly, by generating and subsequently modifying an address for a far-end device, the system may enable consistent, reliable service that may react properly when a provider SAP does not have the far-end customer address stored.

BRIEF DESCRIPTION OF THE DRAWINGS

In order to better understand various exemplary embodiments, reference is made to the accompanying drawings wherein.

DETAILED DESCRIPTION

Referring now to the drawings, in which like numerals refer to like components or steps, there are disclosed broad aspects of various exemplary embodiments.

Figure 1:
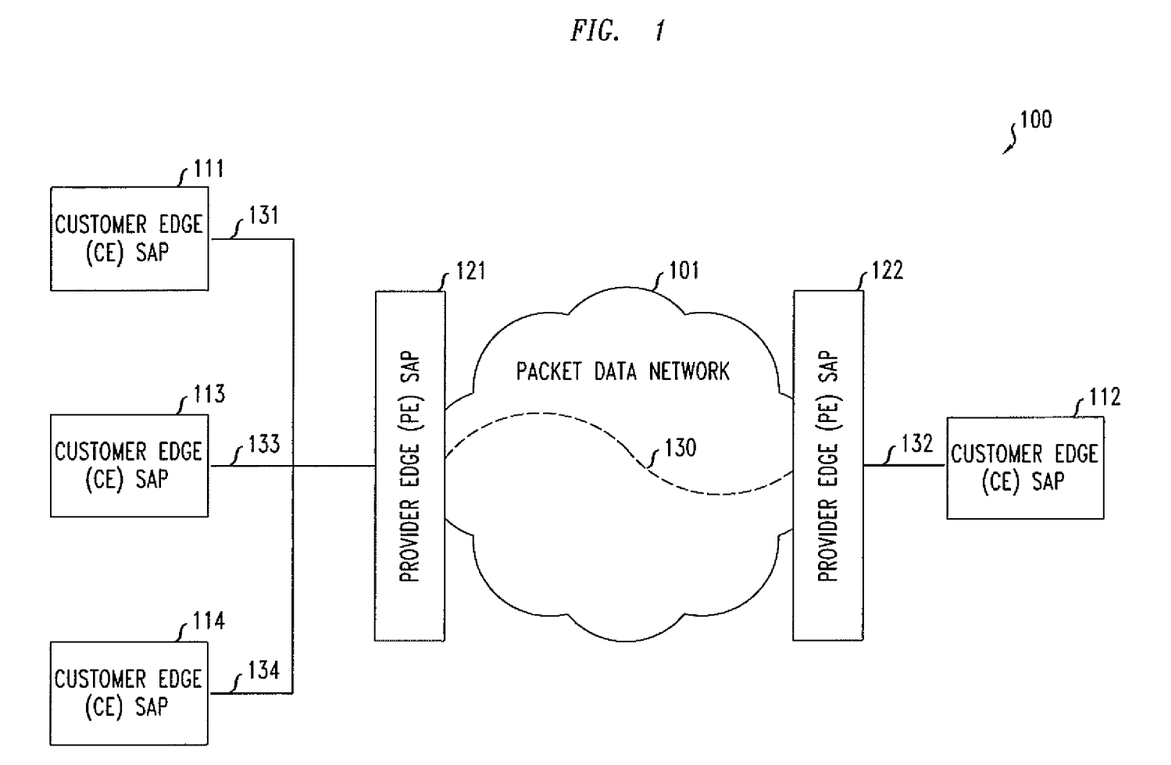
FIG. 1 illustrates an exemplary embodiment of the pseudo-local area network (LAN) through a packet data network.

FIG. 1 illustrates an exemplary embodiment of the pseudo-local area network (LAN) through a packet data network. In various exemplary embodiments, communications system 100 includes a packet data network 101, customer edge (CE) service access providers (SAPs) 111-114, provider edge (PE)

SAPs 121-122, pseudowire 130, and local connections 131-134. Pseudowire 130 may be established through packet data network 101 to connect PE SAPs 121, 122, which may, in turn, establish a pseudo-local area network (pseudo-LAN), Internet Protocol LAN service (IPLS), virtual private wire service (VPWS), or virtual private network (VPN) that includes CE SAPs 111-114 and PE SAPs 121, 122. In the illustrative embodiment, for example, communications system 100 may include a VPWS that includes the SAPs 111-114.

In some embodiments, the communications network 100 may be a network incorporating hardware dedicated to a customer entity. In such embodiments, the devices in the communications network 100 may be configured such that the devices 111-114, 121-122 in the communications network 100 occupy the same address space. This may include devices that connect directly to each other at the same site and may also include devices located at two different sites that communicate with each other through the packet data network 101. In some embodiments, the devices may be located behind the same security boundary, which may isolate devices within the boundary from outside devices, with some control of communications at the border between such devices.

Packet data network 101 may be a packet-switched network operating in accordance with a packet-based protocol, such as Transmission Control Protocol/Internet Protocol (TCP/IP), Multiprotocol Label Switching (MPLS), Asynchronous Transfer Mode (ATM), Frame Relay (FR), Ethernet, Provider Backbone Transport (PBT), High-Level Data Link Control (HDLC), or any other suitable packet-based protocol that will be apparent to one of skill in the art. More specifically, data packet network 101 may communicate using Layer 2 or Layer 3 protocols, such as MPLS or IPv4 and IPv6 Internet protocol.

Customer edge (CE) service access points (SAPs) 111-114 may be devices or nodes in the communications network 100. CE SAPs 111-114 may be network nodes or devices, such as routers or switches, that may be configured to transmit packets to other devices, such as other CE SAPs in the pseudo-LAN or provider edge SAPs. CE SAPs 111-114 may be capable of communications with other devices within and outside of the pseudo-LAN, using multiple layers of the OSI reference model, such as, for example, Layer 3 communications using MPLS (L3MPLS) or Layer 2 communications using Ethernet and Virtual Private LAN Service (VPLS). Each of the CE SAPs may include a similar address space. For example, CE SAPs 111-114 may share common portion of an IPv6 prefix, such as "2001:fc3:85a7::812e:e70:," with specific addresses within the address space. CE SAP 111 may have, for example, "7334/128" as the remaining portion of the IPv6 address, while CE SAP 112 may have "7335/128" as its remaining portion.

Provider edge (PE) SAP 121-122 may be a node or device in the communications network 100, such as a router, switch, or similar hardware device located on the edge of the packet data network 101. PE SAPs 121-122 may be configured to receive packets from the CE SAPs 111-114 and transmit these packets to other devices through direct connections, such as 131-134, or through the packet data network 101 to other devices through intermediaries, such as other PE SAPs 121-122.

Pseudowire 130 may be an embodiment of a service that transmits a packet over a packet-switching network. Pseudowire 130 may be, for example, a pseudowire end-to-end (PWE3) that transports customer data packets over an MPLS network. In some embodiments, the pseudowire 130 may only transport packets between devices of the same type or using the same service. In other embodiments, the pseudowire 130 may also transport packets between devices of a different type or using a different service. This may occur, for example, when the packets' payload consists solely of IP datagrams.

Local connections 131-134 may be wired or wireless connections or attachment circuits that enable the transfer of packets from the CE SAPs 111-114 to the PE SAPs 121-122, respectively. Local connections 131-134 may be configured to support one or more services that support the transfer of packets between devices, such as, for example, TCP/IP, MPLS, ATM, FR, Ethernet, PBT, and HDLC. In the illustrative embodiment, the PE SAP 121 may include one or more services to connect to the CE SAPs 111, 113, 114. For example, the local connection between the CE SAP 111 and the PE SAP 121 may be a Frame Relay (FR) link.

Having described the components of the communications network 100, a brief summary of the operation of the communications network 100 will be provided. It should be apparent that the following description is intended to provide an overview of the operation of the communications network and is therefore a simplification in some respects. The detailed operation of the communications network 100 will be described in further detail below in relation to, for example FIGS. 2-4.

According to various exemplary embodiments, the PE SAP 121 may connect with the CE SAPs 111, 113, and 114. When connected, the PE SAP 121 may obtain the addresses of each CE SAP 111, 113, 114. PE SAP 121 may obtain at least one address associated with the CE SAP 111, for example, upon receipt of an Inverse Neighbor Solicitation message originating from the CE SAP 111. The Inverse Neighbor Solicitation message may be a request for another device from which the CE SAP 111 does not already have an address, such as, for example CE SAP 112.

The addresses of the CE SAPs 111, 113, 114 may include, for example, the IPv6 address, the data link connection identifier (DLCI), and/or the MAC address. Once obtained, the PE SAP 121 may store each of the obtained addresses. PE SAP 121 may, for example, store an obtained IPv6 address for the CE SAP 111 in an Address Resolution Protocol (ARP) Cache that may be included with the PE SAP 121. When the PE SAP 121 already has the address for CE SAP 112 stored, the PE SAP 121 may then include at least one of the stored addresses associated with the CE SAP 112 in an Inverse Neighbor Advertisement sent back to the CE SAP 111. PE SAP 121 may have already stored at least one address associated with CE SAP 112 as a result of receiving a Neighbor Solicitation message from the CE SAP 112. PE SAP 121 may have received the Neighbor Solicitation originating from CE SAP 112 when the pseudowire between the PE SAP 121 and the PE SAP 122 has been established in response to the establishment of a service. Such service establishment may include, for example, establishing a Virtual Leased Line (VLL) for the CE SAPs 111-114 within the communications network 100.

In some instances, however, the pseudowire may not already be established for the PE SAP 121 to receive Neighbor Solicitation messages. This may occur, for example, during the initialization of a service, which may be in response or associated with an Inverse Neighbor Solicitation message originating from the CE SAP 111. In such instances, the PE SAP 121 has no address for the target device CE SAP 112 stored and will not reply to the Inverse Neighbor Solicitation. As will be discussed in further detail below, the PE SAP 121 may, in such instances, generate an address for the target device using known values, such as its own MAC address, and may thereafter modify the target address to the "true" address acquired once the service is properly established. In such embodiments, the generated rule may enable a service to become established and may therefore allow a PE SAP 121, 122 to receive Neighbor Solicitation messages from far-end devices and thus enables the PE SAPs 121, 122 to store these values and return valid addresses upon further queries.

Figure 2:
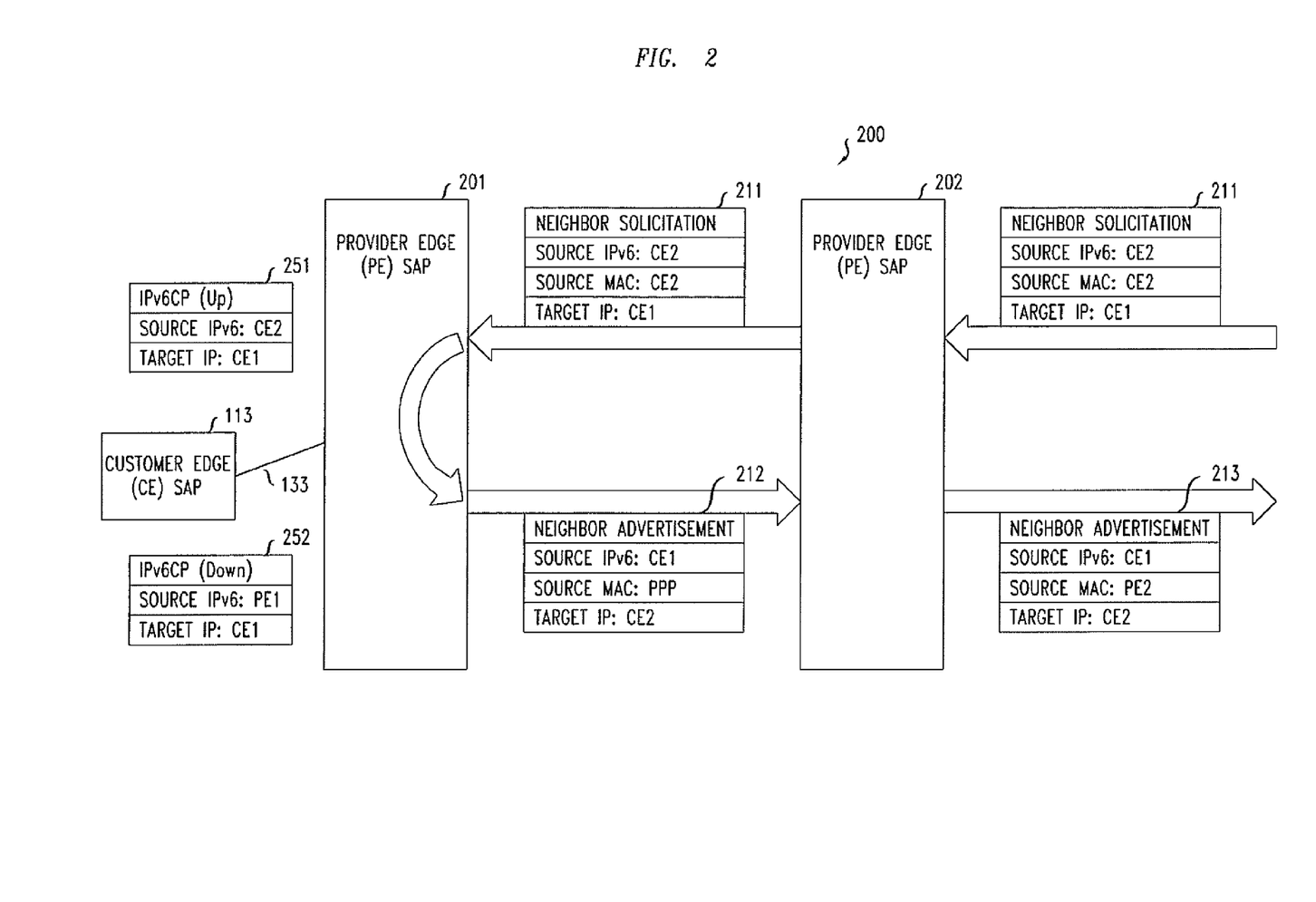
FIG. 2 illustrates an exemplary datapath for a Point-to-Point Protocol (PPP) customer edge service access point (SAP)

FIG. 2 illustrates an exemplary datapath for a Point-to-Point Protocol (PPP) customer edge service access point (SAP). PE SAP 201 and PE SAP 202 may be similar to the PEs SAP 121-122 of the communications system 100 in FIG. 1. PE SAPs 201,202 may receive and transmit messages to and from other devices (not shown), such as Neighbor Solicitation messages 211 and Neighbor Advertisement messages 212, 213. In order to transfer packets between attachment circuits of different types, such as the local connections 131-134\that may be using a different service, the PE SAPs 201, 202** may perform ARP mediation, which may resolve Layer 2 addresses when different resolution protocols are used in the attachment circuits.

When a service is active, a CE, such as CE SAP 112 in the communications system 100 in FIG. 1, may send a Neighbor Solicitation message 211 to the PE SAP 202 in order to perform address discovery. In some embodiments, no addresses for the constituent devices in the communications system are pre-configured, so the devices may perform address discovery at various stages in order to acquire the addresses (including the IPv6 address, link local address, and/or MAC address) of other devices in the communications system 200. Upon receipt of the Neighbor Solicitation message 211, the PE SAP 202 may extract a MAC address and IP address (e.g., IPv6 address) of the source of the message, and may store the values of these addresses in memory, such as an Address Resolution Protocol (ARP) cache included with the PE SAP 202.

PE SAP 202 may then send the Neighbor Solicitation message through the pseudowire 130 to the PE SAP 201, which may also extract and store the addresses of the source device in its memory. In some embodiments, the PE SAP 201 may use IPv6 Control Protocol (IPv6CP) negotiation 251 to bring up the PPP local connection 133 with the CE SAP 113. This may trigger the PE SAP 201 to generate a Neighbor Advertisement 212 message and forward the Neighbor Advertisement message 212 through the pseudowire to the PE SAP 202.

When generating the Neighbor Advertisement message 212, the PE 201 may copy a number of values from the Neighbor Solicitation message 211. For example, the PE SAP 201 may copy the link local address of the CE SAP 113 that was learned through the IPv6CP negotiation to use as the source address in the Neighbor Advertisement message 212. PE SAP 201 may also add a Layer 2 address in the Neighbor Advertisement message (in the illustrative embodiment, a PPP Layer 2 address) and may copy the source IP address of the Neighbor Solicitation message as the destination IP address of the Neighbor Advertisement message. Once the Neighbor Advertisement message 212 is created, the PE SAP 201 may send the Neighbor Advertisement message 212 through the pseudowire to the PE SAP 202. In some embodiments, the PE SAP 201 may also bounce the IPv6CP SAP (in the illustrative example, CE SAP 113), using the IP address of the source CE SAP (e.g., CE SAP 112) to set a new link local address for the CE SAP 113.

Upon receipt of the Neighbor Advertisement message 212, the PE SAP 202 may replace the Layer 2 address of the Neighbor Advertisement message 212 with its own MAC address. In some embodiments, the PE SAP 202 may also extract the addresses of the source CE SAP 213 that triggered the generation of the Neighbor Advertisement message 212 and store the address values in its memory. After replacing this value, the PE SAP 202 may then forward the modified Neighbor Advertisement message 213 to the CE SAP 112.

In some embodiments, the PE SAP 201 and/or the PE SAP 202 may not reply to the Neighbor Solicitation message 211. This may occur, for example, when the service is not active, as the PE SAPs 201, 202 would drop such messages. In such instances, the PE SAPs 201, 202 may not acquire and store the addresses of far-end CE SAPs, as it would not receive either Neighbor Solicitation or Neighbor Advertisement messages 211-212 due to the pseudowire not being established. This action may occur in some embodiments, as it is desirable to refrain from establishing the pseudowire before the IPv6CP negotiation has completed. Allowing Neighbor Solicitation and Neighbor Advertisement messages to pass through the service before the IPv6CP negotiation would also cause all user data to pass through the service, which may be avoided in preferred embodiments. Thus, in the preferred embodiment, during an IPv6CP negotiation with an attached CE SAP, such as the CE SAP 213, the needed far-end link local address for the proper negotiation is not known by the PE SAP 201.

In some embodiments, the PE SAP 201 may therefore use its own MAC address to generate a temporary link local address in order to perform a proper IPv6CP negotiation 252 with the CE SAP 213. As the IPv6CP negotiation 252 may trigger the service to become active, the PE SAP 201 may subsequently receive Neighbor Solicitation and Advertisement messages 211-212 over the now-established pseudowire. PE SAP may then extract the actual link local address of the far-end CE SAP 112. Once the actual link local address of the far-end CE SAP 112 is known, the PE SAP 201 may then use the actual link local address in an IPv6CP renegotiation 251 with the CE SAP 113.

When generating the temporary link local address from its MAC address, the PE SAP 201 may need to add values due to the differing lengths of the MAC address and the IPv6 address, for example. For example, the PE SAP 201 may insert two octets, such as 0xFF and 0xFE in the middle of the MAC address. This insertion may be between the company id and the vendor-supplied id of the MAC address, which should be known to a person of skill in the art.

Figure 3:
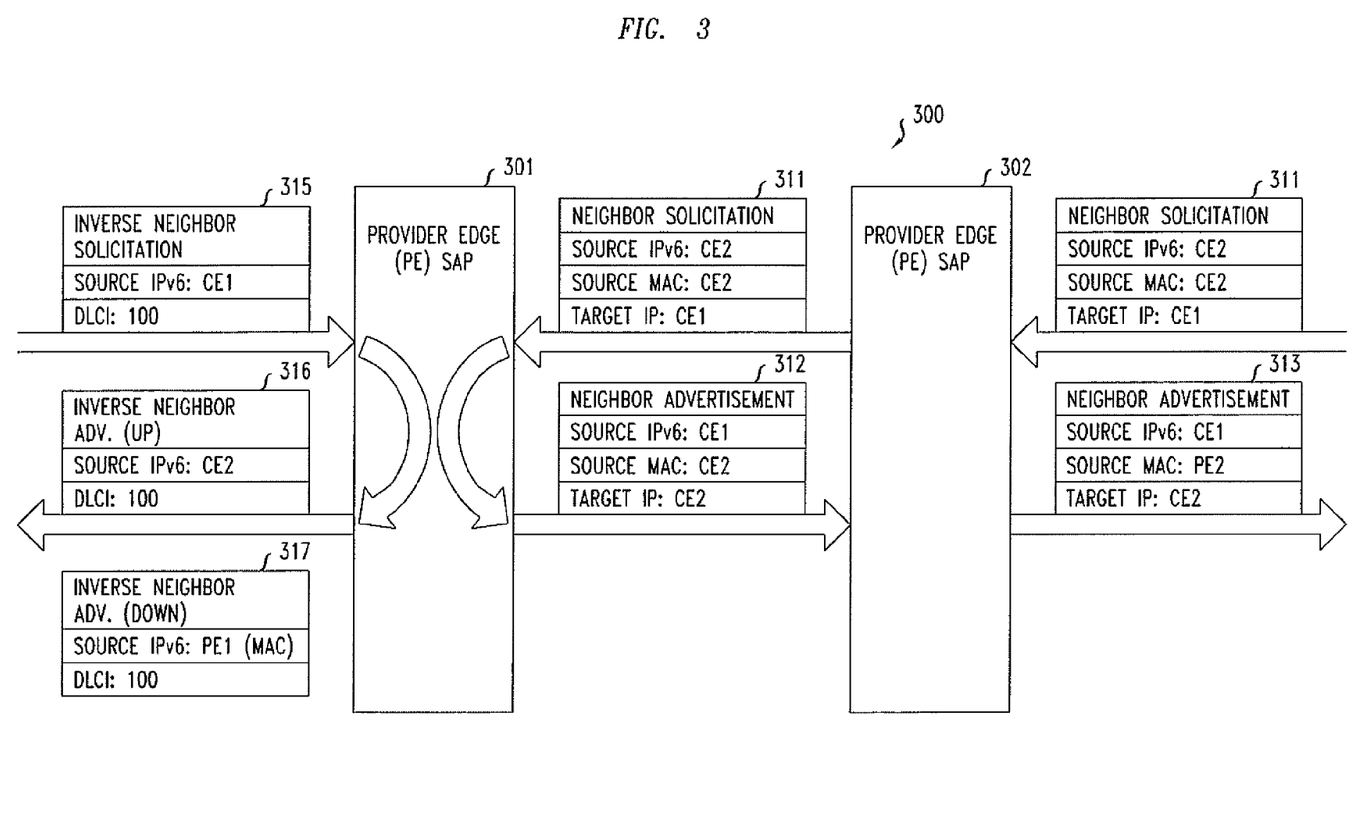
FIG. 3 illustrates an exemplary datapath for a Frame Relay (FR) customer edge SAP.

FIG. 3 illustrates an exemplary datapath for a Frame Relay (FR) customer edge SAP. The datapath for the communications system 300 is similar to the datapath for communications system 200 in FIG. 2, except that the PE SAP 301 responds to an Inverse Neighbor Solicitation message 315 instead of PE SAP 201 initiating the IPv6CP negotiation, as the PE SAP 201 in Frame Relay does not initiate the address discovery process.

In the illustrative embodiment, the PE SAP 301 receives the Neighbor Solicitation message 311 over the pseudowire 130 originating from the CE SAP 112. Meanwhile, the CE SAP 111 independently sends an Inverse Neighbor Solicitation message 315 to the PE SAP 301. The Inverse Neighbor Solicitation message 315 may contain the address of the CE SAP 111, including, for example, its IPv6 address, and its data link connection identifier (DLCI). Upon receipt of the Inverse Neighbor Solicitation message 315, the PE SAP 301 may store the IPv6 address for the CE SAP 111.

When the PE SAP 301 has a previously stored address for the source of the Neighbor Solicitation message 311, the PE SAP 301 may reply to the Inverse Neighbor Solicitation message 315 with an Inverse Neighbor Advertisement message 316. The Inverse Neighbor Advertisement message 316 may contain the IP address of the source of the Neighbor Solicitation message 311 and the local DLCI of the CE SAP 111.

In some embodiments, when the PE SAP 301 does not have the address of the source of the Neighbor Solicitation message 311 previously stored, it may not reply to the Inverse Neighbor Solicitation message 311. This may occur, for example, when the PE SAP 301 has not received a Neighbor Solicitation message 311 due to, for example, the service not yet being established or active. In some embodiments, the PE SAP 301 may generate an Inverse Neighbor Advertisement message 317 using a temporary IP address generated from its own MAC address in lieu of the IP address of the source of the Neighbor Solicitation message 311. In such instances, the PE SAP 301 may, upon receipt of the Neighbor Solicitation message 311, replace the temporary IP address in its storage and generate a subsequent Inverse Neighbor Advertisement message 316 with the actual IP source address.

Figure 4:
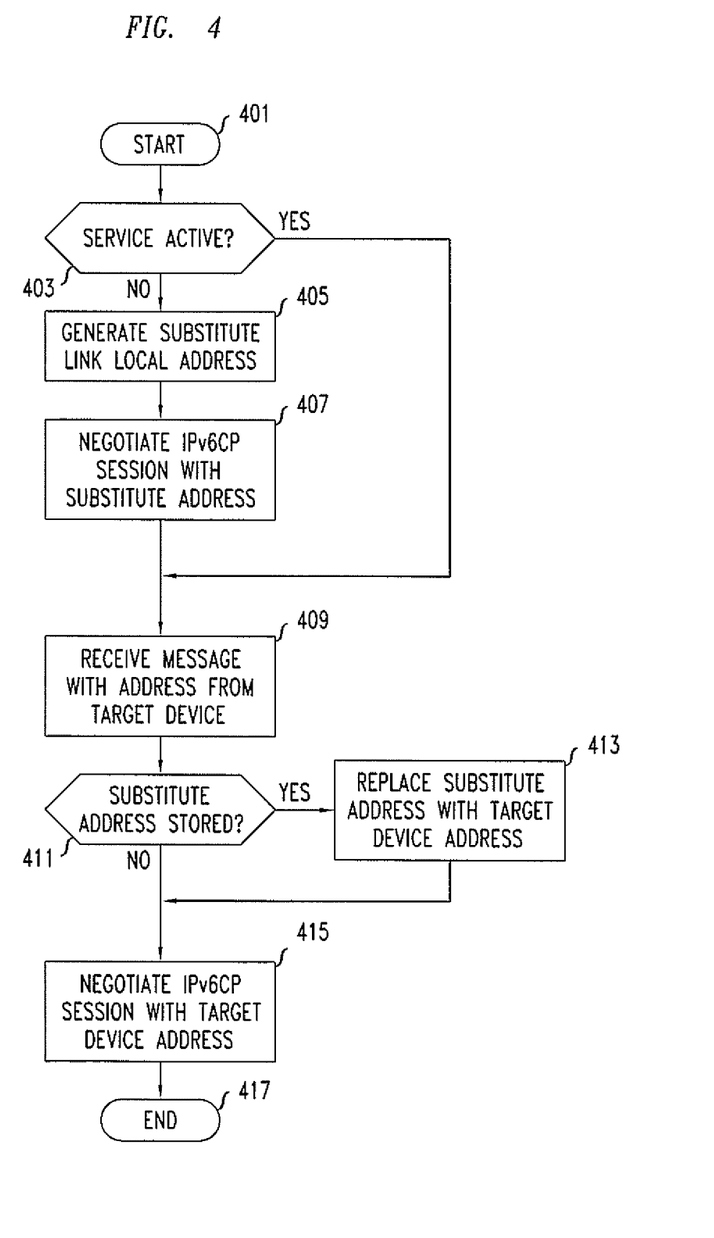
FIG. 4 illustrates an exemplary flowchart for determining an address for a far-end customer edge SAP through the packet data network.

FIG. 4 illustrates an exemplary flowchart for determining an address for a far-end customer edge SAP through the packet data network. PE SAP 201 may perform method 400, for example, when initiating an IPv6CP negotiation 252 with a CE SAP 113 over a PPP attachment circuit 133 or generating an Inverse Neighbor Advertisement message 317 through an FR attachment circuit 131 with a CE SAP 111.

Method 400 begins at step 401 and continues to step 403, where the PE SAP 201 determines whether the service is active. When the service is active, the PE SAP 201 may receive and process Neighbor Solicitation messages 211 and may therefore acquire and store the actual local link address of the far-end CE SAP 112 upon receipt of the Neighbor Solicitation message 211. In such instances, the PE SAP 201 may proceed to step 409; otherwise, the PE SAP 201 in step 403 determines that the service is not active and proceeds to step 405.

In step 405, the PE SAP 201 may generate a substitute link local address for the far-end CE SAP 112. In some embodiments, the PE SAP 201 may generate the substitute link local address from its own MAC address, adding octets to the middle of the MAC address to convert the value from a MAC address value to an IPv6 address value. In other embodiments, the PE SAP 201 may generate the substitute link local address from other values, such as, for example, an unallocated IPv6 address in the address space of the pseudo-LAN. In some embodiments, the PE SAP 201 may store the value of the substitute link local address in its memory, which may be, for example, and ARP cache.

PE SAP 201 may then proceed to step 407, where the PE SAP 201 initiates an IPv6CP negotiation with the local CE SAP 113 over an attachment circuit 113 using the generated substitute address. In other embodiments, the PE SAP 201 may conduct similar ARP mediation techniques using the generated temporary address. Other ARP mediation techniques may include, for example generating an Inverse Neighbor Advertisement message 317 using the substitute address.

After step 407, the IPv6CP negotiation may cause an IPv6CP session to be up, which may cause the service to become active. The service, once active, may also trigger the pseudowire to be established in some embodiments. In some embodiments, the active service allows the PE SAP 201 in step 409 to receive and process Neighbor Solicitation or Advertisement messages 211-212 from the far-end CE SAP 112.

Upon receipt of the Neighbor Solicitation message 211 or Neighbor Advertisement message 212 in step 409, the PE SAP 201 may in step 411 determine whether the PE SAP 201 stored a substitute link local address for the CE SAP 112 that initiated the Neighbor Solicitation message 211 or Neighbor Advertisement message 212. When the substitute link local address is stored in the PE SAP 201, the PE SAP 201 in step 413 may replace the substitute link local address with the actual link local address extracted from the Neighbor Solicitation message 211 or the Neighbor Advertisement message 212.

In step 415, the PE SAP 201 may initiate an IPv6CP negotiation with the local CE SAP 113 over the local attachment circuit 113 using the actual link local address. The IPv6CP negotiation may be similar to that step 407. Similarly, PE SAP 201 may perform other ARP mediations in a similar manner to the ARP mediations described in relation to step 407, with the PE SAP 201 using the actual link local address. After the IPv6CP negotiation or renegotiation, the PE SAP 201 may end the process 400 at step 417.

The illustrative embodiments therefore disclose a system and related method of bringing up an IPv6CP session between a pseudowire SAP and a CE SAP when the service is not active. By generating a substitute link local address for IPv6CP negotiation, the service enables proper ARP mediation even before the receipt of Neighbor Solicitation or Neighbor Advertisement messages, which may require a service to be active before a pseudowire SAP receives and/or extracts relevant information from them.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

We claim:

1. A method of a provider service access point (SAP) determining an address of a customer SAP, the method comprising:

determining that a virtual leased line (VLL) service connecting a second customer SAP and the first customer SAP is not active;

using its media access control (MAC) address to create a substitute IPv6 link local address, wherein the substitute IPv6 link local address acts as the IPv6 link local address for the second customer SAP;

establishing an IPv6CP session with the first customer SAP using the substitute IPv6 link local address;

receiving a Neighbor Solicitation packet or Neighbor Advertisement packet over the VLL service, wherein the established IPv6CP session triggered the VLL service to become active;

extracting, from the Neighbor Solicitation packet or Neighbor Advertisement packet, a true IPv6 link local address for the second customer SAP; and renegotiating the IPv6CP session, wherein the true IPv6 link local address replaces the substitute IPv6 link local address.

2. The method of claim 1, wherein the Neighbor Solicitation message originates from the second customer SAP.

3. The method of claim 1, wherein the Neighbor Advertisement message originates from the first customer SAP.

4. The method of claim 1, wherein the Neighbor Advertisement or Neighbor Solicitation packet traverses from the first or second customer SAPs through an attachment circuit before said receiving.

5. The method of claim 4, wherein the VLL service uses the attachment circuit to connect to the first or second customer SAP.

6. The method of claim 4, wherein the attachment circuit is a link using a protocol selected from the group consisting of Frame Relay (FR), Point-to-Point Protocol (PPP), Ethernet, and High-Level Data Link Control (HLDC).

7. The method of claim 6, wherein the packet data network is an MPLS network.

8. The method of 1, wherein the provider SAP receives the Neighbor Solicitation packet or Neighbor Advertisement packet from a second provider SAP over a packet data network.

9. The method of claim 1, further comprising:
reestablishing the VLL service, wherein the VLL service uses the renegotiated IPv6CP session to connect the provider and first customer SAPs.

10. The method of claim 1, further comprising:
storing the substitute IPv6 link local address after the using step; and
replacing the substitute IPv6 link local address with the true IPv6 link local address after the extracting step.

11. A system of determining an address of a customer service access point (SAP), the system comprising:
a first customer SAP connected to a packet data network that includes a true IPv6 link local address;
a second customer SAP that solicits the true IPv6 link local address when a virtual leased line (VLL) service between the first and second customer SAPs is not active; and
a provider SAP connected to the second customer SAP and the packet data network that:
determines when the VLL service connecting a first and second customer SAP is not active;
uses its media access control (MAC) address to create a substitute IPv6 link local address, wherein the substitute IPv6 link local address acts as the IPv6 link local address for the first customer SAP;
establishes an IPv6CP session with the second customer SAP using the substitute IPv6 link local address;
receives a Neighbor Solicitation packet or Neighbor Advertisement packet over the VLL service, wherein the established IPv6CP session triggered the VLL service to become active;
extracts, from the Neighbor Solicitation packet or Neighbor Advertisement packet, a true IPv6 address for the first customer SAP; and
reestablishes the IPv6CP session, wherein the true IPv6 link local address replaces the substitute IPv6 link local address.

12. The system of claim 11, wherein the Neighbor Solicitation message originates from the first customer SAP.

13. The system of claim 11, wherein the Neighbor Advertisement message originates from the second customer SAP.

14. The system of claim 11, wherein the second customer SAP and the provider SAP are connected through an attachment circuit, and further wherein the Neighbor Advertisement or Neighbor Solicitation packet traverses from the first customer SAP through the attachment circuit before being received by the provider SAP.

15. The system of claim 14, wherein the VLL service uses the attachment circuit to connect to the first customer SAP.

16. The system of claim 14, wherein the attachment circuit is a link using a protocol selected from the group consisting of Frame Relay (FR), Point-to-Point Protocol (PPP), Ethernet, and High-Level Data Link Control (HLDC).

17. The system of claim 16, wherein the packet data network is an MPLS network.

18. The system of claim 11, wherein the provider SAP receives the Neighbor Solicitation packet or Neighbor Advertisement packet from a second provider SAP over a packet data network.

19. The system of claim 11, wherein the provider SAP reestablishes the VLL service using the renegotiated IPv6CP session to connect the provider and second customer SAPs.

20. The system of claim 11, wherein the provider SAP stores the substitute IPv6 link local address after the using step and replaces the substitute IPv6 link local address with the true IPv6 link local address after extraction from the Neighbor Solicitation packet or Neighbor Advertisement packet.

* * * * *